(12) United States Patent
Virnich et al.

(10) Patent No.: US 9,000,331 B2
(45) Date of Patent: Apr. 7, 2015

(54) CAPACITIVE SENSING SYSTEM ABLE OF USING HEATING ELEMENT AS ANTENNA ELECTRODE

(71) Applicant: IEE International Electronics & Engineering S.A., Echternach (LU)

(72) Inventors: Michael Virnich, Korlingen (DE); David Hoyer, Ayl (DE); Martin Thinnes, Trierweiler (DE); Michael Puetz, Trier (DE); Thomas Meyers, Bitburg (DE); Laurent Lamesch, Reichlange (LU)

(73) Assignee: IEE International Electronics & Engineering S.A., Luxembourg (LU)

( * ) Notice: Subject to any disclaimer, the term of this patent is extended or adjusted under 35 U.S.C. 154(b) by 351 days.

(21) Appl. No.: 13/623,199

(22) Filed: Sep. 20, 2012

(65) Prior Publication Data

US 2013/0092677 A1    Apr. 18, 2013

(30) Foreign Application Priority Data

Sep. 21, 2011    (LU) .......................................... 91872

(51) Int. Cl.
*B60L 1/02* (2006.01)
*G01R 27/26* (2006.01)
(Continued)

(52) U.S. Cl.
CPC ............ *B60R 21/015* (2013.01); *B60N 2/5685* (2013.01); *B62D 1/046* (2013.01); *B62D 1/065* (2013.01); *B60N 2/002* (2013.01); *B60R 21/01532* (2013.01)

(58) Field of Classification Search
CPC ................ B60R 21/015–21/1566; B60N 2/00

USPC .................... 219/202–204, 217; 324/658, 686
See application file for complete search history.

(56) References Cited

U.S. PATENT DOCUMENTS 3,705,365 A    12/1972    Szabo et al.
4,104,715 A    8/1978    Lawson, Jr.
(Continued)

FOREIGN PATENT DOCUMENTS

DE        102009055424 A1    7/2011
EP              1553699 A1    7/2005
(Continued)

OTHER PUBLICATIONS

International Search Report; International Application No. PCT/EP2011/054343; International Application Filing Date Mar. 22, 2011; Mail Date Jun. 1, 2011.
(Continued)

*Primary Examiner* — Sang Y Paik
(74) *Attorney, Agent, or Firm* — Cantor Colburn LLP

(57) ABSTRACT

A capacitive sensing system for being connected to a heating element comprises a capacitive detector connectable to the heating element and a common mode choke for essentially preventing alternating current from flowing from the heating element to the heating current supply. The capacitive detector is configured for driving an alternating current into the heating element and for producing an output indicative of capacitance based upon the alternating current. The choke has a first and a second winding for connecting the heating element with the heating current supply. The choke comprises a third winding connected in parallel of the first and/or second winding. The capacitive detector is configured for measuring a portion of the alternating current flowing across the third winding and for taking into account the measured portion of alternating current when producing the output.

15 Claims, 3 Drawing Sheets

(51) Int. Cl.
  *B60R 21/015* (2006.01)
  *B60N 2/56* (2006.01)
  *B62D 1/04* (2006.01)
  *B62D 1/06* (2006.01)
  *B60N 2/00* (2006.01)

(56) References Cited

U.S. PATENT DOCUMENTS

| | | |
|---|---|---|
| 4,363,008 A | 12/1982 | Chambers, Jr. |
| 6,161,070 A | 12/2000 | Jinno et al. |
| 6,392,542 B1 | 5/2002 | Stanley |
| 6,661,115 B2 | 12/2003 | Lester |
| 6,703,845 B2 | 3/2004 | Stanley et al. |
| 7,521,940 B2 | 4/2009 | Koch et al. |
| 8,373,952 B2 * | 2/2013 | Mirafzal et al. ............ 361/45 |
| 2008/0186282 A1 | 8/2008 | Nix et al. |
| 2009/0295199 A1 | 12/2009 | Kincaid et al. |
| 2009/0295411 A1 | 12/2009 | Hansen |
| 2010/0038351 A1 | 2/2010 | Tabaczynski |
| 2011/0121618 A1 | 5/2011 | Fischer et al. |
| 2011/0148648 A1 | 6/2011 | Fischer et al. |
| 2012/0234816 A1 | 9/2012 | Petrenko et al. |
| 2013/0027065 A1 | 1/2013 | Stanley et al. |

FOREIGN PATENT DOCUMENTS

| | | |
|---|---|---|
| EP | 2036764 A1 | 3/2009 |
| EP | 2090460 A1 | 8/2009 |
| JP | 10325136 A | 12/1998 |
| WO | 9217344 A1 | 10/1992 |
| WO | 9513204 A1 | 5/1995 |
| WO | 2008095939 A1 | 8/2008 |

OTHER PUBLICATIONS

Written Opinion International Application No. PCT/EP2011/054343; International Application Filing Date Mar. 22, 2011; Mail Date Jun. 1, 2011.
Luxembourg Search Report; Luxembourg Application No. LU91872; Dated May 2, 2012.
Joshua Smith, "Electric Field Sensing for Graphical Interfaces" IEEE Computer Graphics and Applications, published in Computer Graphics I/O Devices, Issue May/Jun. 1998, pp. 54-60.
International Search Report; International Application No. PCT/EP2011/054346; International Application Filing Date Mar. 22, 2011; Mail Date May 24, 2011.
Luxembourg Search Report; Luxembourg Application No. 91879: Dated May 3, 2012.
Written Opinion; International Application No. PCT/EP2011/054346; International Application Filing Date Mar. 22, 2011; Mail Date May 24, 2011.

* cited by examiner

CAPACITIVE SENSING SYSTEM ABLE OF USING HEATING ELEMENT AS ANTENNA ELECTRODE

TECHNICAL FIELD

The present invention generally relates to a capacitive sensing system that can use a heating element as its antenna electrode. A capacitive sensing system as proposed herein may e.g. be used for detecting the absence or presence of an occupant on an occupiable item, which might be a vehicle seat, a hospital bed etc., or for detecting a driver's hand on the steering wheel.

BACKGROUND ART

A capacitive sensor, called by some electric field sensor or proximity sensor, designates a sensor, which generates a signal responsive to the influence of what is being sensed (a person, a part of a person's body, a pet, an object, etc.) upon an electric field. A capacitive sensor generally comprises at least one antenna electrode, to which is applied an oscillating electric signal and which thereupon emits an electric field into a region of space proximate to the antenna electrode, while the sensor is operating. The sensor comprises at least one sensing electrode at which the influence of an object or living being on the electric field is detected. In some (so-called "loading mode") capacitive occupancy sensors, the one or more antenna electrodes serve at the same time as sensing electrodes. In this case, the measurement circuit determines the current flowing into the one or more antenna electrodes in response to an oscillating voltage being applied to them. The relationship of voltage to current yields the complex impedance of the one or more antenna electrodes. In an alternative version of capacitive sensors ("coupling mode" capacitive sensors), the transmitting antenna electrode(s) and the sensing electrode(s) are separate from one another. In this case, the measurement circuit determines the current or voltage that is induced in the sensing electrode when the transmitting antenna electrode is operating.

The different capacitive sensing mechanisms are explained in the technical paper entitled "Electric Field Sensing for Graphical Interfaces" by J. R. Smith, published in Computer Graphics I/O Devices, Issue May/June 1998, pp 54-60. The paper describes the concept of electric field sensing as used for making non-contact three-dimensional position measurements, and more particularly for sensing the position of a human hand for purposes of providing three dimensional positional inputs to a computer. Within the general concept of capacitive sensing, the author distinguishes between distinct mechanisms he refers to as "loading mode", "shunt mode", and "transmit mode" which correspond to various possible electric current pathways. In the "loading mode", an oscillating voltage signal is applied to a transmit electrode, which builds up an oscillating electric field to ground. The object to be sensed modifies the capacitance between the transmit electrode and ground. In the "shunt mode", an oscillating voltage signal is applied to the transmit electrode, building up an electric field to a receive electrode, and the displacement current induced at the receive electrode is measured, whereby the displacement current may be modified by the body being sensed. In the "transmit mode", the transmit electrode is put in contact with the user's body, which then becomes a transmitter relative to a receiver, either by direct electrical connection or via capacitive coupling. "Shunt mode" is alternatively referred to as the above-mentioned "coupling mode".

Capacitive occupant sensing systems have been proposed in great variety, e.g. for controlling the deployment of one or more airbags, such as e.g. a driver airbag, a passenger airbag and/or a side airbag. U.S. Pat. No. 6,161,070, to Jinno et al., relates to a passenger detection system including a single antenna electrode mounted on a surface of a passenger seat in an automobile. An oscillator applies on oscillating voltage signal to the antenna electrode, whereby a minute electric field is produced around the antenna electrode. Jinno proposes detecting the presence or absence of a passenger in the seat based on the amplitude and the phase of the current flowing to the antenna electrode. U.S. Pat. No. 6,392,542, to Stanley, teaches an electric field sensor comprising an electrode mountable within a seat and operatively coupled to a sensing circuit, which applies to the electrode an oscillating or pulsed signal "at most weakly responsive" to wetness of the seat. Stanley proposes to measure phase and amplitude of the current flowing to the electrode to detect an occupied or an empty seat and to compensate for seat wetness.

The idea of using the heating element of a seat heater as an antenna electrode of a capacitive occupancy sensing system has been known for a long time. WO 92/17344 A1 discloses a an electrically heated vehicle seat with a conductor, which can be heated by the passage of electrical current, located in the seating surface, wherein the conductor also forms one electrode of a two-electrode seat occupancy sensor.

WO 95/13204 discloses a similar system, in which the oscillation frequency of an oscillator connected to the heating element is measured to derive the occupancy state of the vehicle seat.

U.S. Pat. No. 7,521,940 relates to a combined seat heater and capacitive sensor capable of operating, at a time, either in heating mode or in occupant-sensing mode. The device includes a sensor/heat pad for transmitting a sensing signal, a first diode coupled to a first node of the sensor/heat pad, a second diode coupled to a second node of the sensor/heat pad, a first transistor coupled to the first diode and a second transistor coupled to the second diode. During sensing mode, the first and second transistors are opened and the nodes between the first transistor and the first diode, as well as between the second transistor and the second diode are reverse-biased to isolate the sensor/heat pad from the power supply of the heating circuit.

U.S. 2009/0295199 discloses a combined seat heater and capacitive sensor, wherein each of the two terminals of the heating element is connected to the heating power supply via two transistors in series. The device may not operate in sensing mode and in heating mode at a time. When the device is in sensing mode, the nodes between each pair of transistors are actively kept at the same potential as the heating element by means of respective voltage followers in order to neutralize any open-switch impedance of the transistors.

The very same idea has already been disclosed in U.S. Pat. No. 6,703,845. As an alternative to transistors, that document discloses inductors to achieve a high impedance at the frequency of the oscillating signal between the heating element and the power source of the heating circuit. As in the previously discussed document, a voltage follower maintains the intermediate nodes substantially at the same potential as the heating element in order to effectively isolate, at the frequency of the oscillating signal, the power supply of the heating circuit from the heating element.

A disadvantage of the system disclosed in U.S. Pat. No. 6,703,845 is that the inductors used as AC-decoupling elements have to support the full heating current (up to 10 A DC and more) and present high AC impedance to the capacitive measurement circuit and the seat heater at the same time.

High inductance and high operating DC current implies that the inductor have to be wound on large cores, which are expensive. Depending on the application chosen from U.S. Pat. No. 6,703,845, either two or four of these inductors have to be used.

U.S. 2011/121618 discloses yet another variant of an occupant detection system including a heating element adjacent the seating surface of a seat. A capacitive occupant detection circuit is electrically coupled to the heating element. A common mode choke is interposed between the heating circuit and the heating element as an isolation circuit that prevents the heating circuit from influencing the occupant detection circuit.

An ideal common mode choke would totally prevent flow of an AC current. In practice, however, an ideal common mode choke does not exist and there will be a residual alternating current across the common mode choke. In order to reduce this residual alternating current to an extent that the isolation circuit can be considered to prevent the heating circuit from influencing the occupant detection circuit, i.e. to an extent that the residual alternating current can be neglected in comparison to the alternating current flowing across the capacitance to be measured, one would have to choose (among the existing common mode chokes) a common mode choke whose resistance to the heating current would result in a considerable loss of heating power in the common mode choke.

BRIEF SUMMARY

An improved capacitive sensing system is provided that can use a heating element as an antenna electrode.

A capacitive sensing system for being connected to a heating element producing heat upon electrical current being caused to flow there across comprises a capacitive detector connectable to the heating element and a common mode choke for essentially preventing alternating current from flowing from the heating element to the heating current supply. The capacitive detector is configured for driving an alternating current into the heating element and for producing an output indicative of capacitance based upon the alternating current. The common mode choke has a first winding for connecting a first terminal of the heating element with a first terminal of the heating current supply and a second winding for connecting a second terminal of the heating element with a second terminal of the heating current supply. According to an aspect of the invention, the common mode choke comprises a third winding (wound on the same core as the first and second windings) connected in parallel of at least one of the first and second windings and the capacitive detector is further configured for measuring a portion of the alternating current flowing across the third winding and for taking into account the measured portion of alternating current when producing the output.

The present invention uses a common mode choke with a coupling factor close to unity to achieve AC-decoupling of the heating element from its power supply. The common mode choke produces high impedance against common mode currents from the heating element into the first and second windings. The capacitive sensing system according to the invention furthermore takes into account the fact that an actual common mode choke cannot perfectly block alternating current. The total residual alternating current across the common mode choke (i.e. the part that cannot be blocked) stands in a known relationship to the portion of the alternating current that flows across the third winding. By measuring this portion of the alternating current, the capacitive sensing system thus can determine the alternating current actually flowing across the capacitance of the heating element.

The capacitive sensing system as described above may be configured as a module so as to be easily connectable between to an existing heating element and its heating current supply. A preferred alternative aspect of the invention concerns a combined (integrated) heating and capacitive sensing system. Such a combined system comprises a heating element for producing heat when electrical current is caused to flow across it, a heating current supply having a first terminal connected to a first terminal of the heating element and a second terminal connected to a second terminal of the heating element so as to form a heating circuit, and a capacitive detector connected to the heating element, configured for driving an alternating current into the heating element and for producing an output indicative of capacitance based upon the alternating current. A common mode choke is provided for essentially preventing the alternating current from flowing from the heating element to the heating current supply. The common mode choke has a first winding connected between the first terminal of the heating element and the first terminal of the heating current supply and a second winding connected between the second terminal of the heating element and the second terminal of the heating current supply. The common mode choke comprises a third winding connected in parallel of at least one of the first and second windings. The capacitive detector is further configured for measuring a portion of the alternating current flowing across the third winding and for taking into account the measured portion of alternating current when producing the output.

The combined heating and capacitive sensing system could e.g. be used in a steering wheel and/or a vehicle seat.

The combined heating and capacitive sensing system may be implemented as a combined seat heating and capacitive occupancy sensing system, the output produced by the capacitive detector being in this case indicative of a seat occupancy state.

In the following, it will be assumed that the heating current is direct current (DC) and that the capacitive measurement uses alternating current (AC) at a certain frequency. This is insofar a simplification that transient states (e.g. switching on/or off of the heating current), noise and parasitic currents are not taken into account. It should also be noted that the heating current need not be direct current in the strictest sense: it may be variable, but on a long time-scale, so as not to interfere with the current used for the capacitive measurement. For sake of simplicity, we will use "DC" to designate slowly varying or constant signals. The capacitance measurement network preferably operates at frequency selected in the range from about 50 kHz to about 10 GHz, more preferably in the range from about 50 kHz to about 30 MHz.

Preferably, the capacitive detector comprises a first current meter configured and arranged for measuring the alternating current driven into the heating element.

Preferably, the capacitive detector comprises a second current meter configured and arranged for measuring the portion of the alternating current flowing across the third winding.

It follows from Kirchhoff's junction rule that the alternating current dissipated via the heating element can be calculated by withdrawing the total alternating current across the common mode choke from the alternating current driven into the heating element. The capacitive detector thus preferably comprises an evaluation circuit operatively connected to the mentioned current meters, the evaluation circuit being configured for producing the output indicative of the capacitance using the measurement signals of the current meters.

According to a preferred embodiment of the invention, the third winding is AC-coupled (e.g. via a coupling capacitor) to a reference node, e.g. circuit ground.

As indicated above, the portion of alternating current flowing across the third winding is indicative of the alternating current flowing across the common mode choke altogether. Assuming that the first, second and third windings are identical and AC-coupled to the same node on the side opposite the heating element, the alternating currents across the windings will be identical. The total alternating current $I_{choke}$ across the common mode choke may in this case be calculated as $I_{choke}=I_1+I_2+I_3=3 \cdot I_3$, where $I_1$, $I_2$ and $I_3$ designates the alternating current across the first, second and third winding, respectively. On the side opposite the heating element, the first and second windings may be connected to the reference node with a low AC-impedance (e.g. by coupling capacitors). In order to avoid that the second current meter introduces to high an AC impedance between the third winding and the reference node, a step-up transformer may be used. The step-up transformer preferably has its primary winding connected between the third winding and the reference node and its secondary winding connected between the reference node and the second current meter. As indicated by the term step-up transformer, the number of turns of the primary winding is lower than the number of turns of the secondary winding. Using this configuration, the AC impedance caused by the second current meter will be reduced by the turn ratio of the step-up transformer.

BRIEF DESCRIPTION OF THE DRAWINGS

Preferred embodiments of the invention will now be described, by way of example, with reference to the accompanying drawings in which.

DESCRIPTION OF PREFERRED EMBODIMENTS

Figure 1:
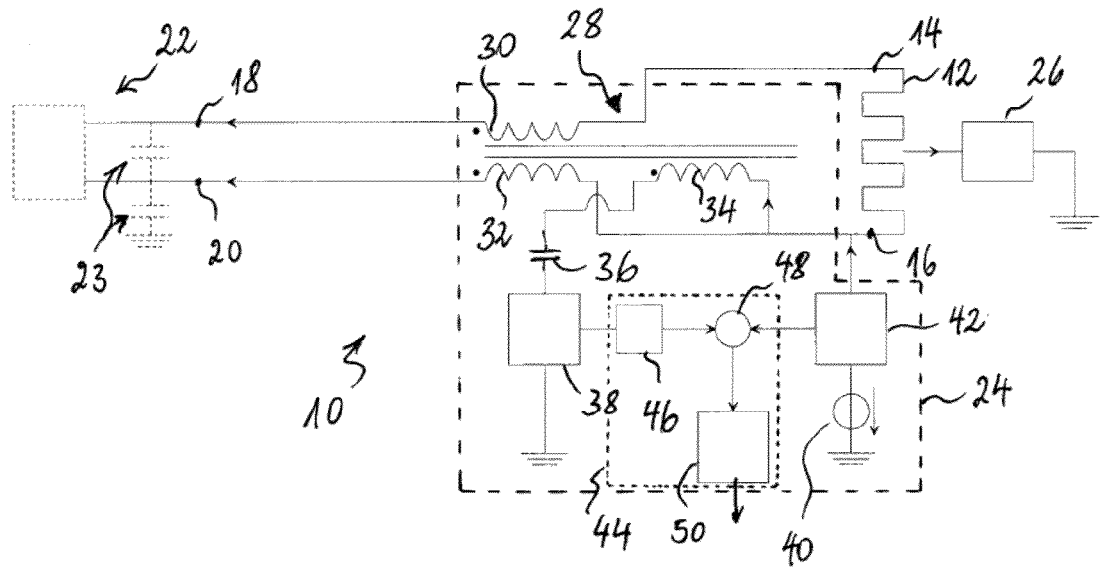
FIG. 1 is a schematic circuit diagram of a combined heating and capacitive sensing system according to a first example of the invention.

FIG. 1 shows a combined heating and capacitive sensing system 10 according to a first example of the invention. The combined system 10 comprises a heating element 12 that produces heat when electrical current is caused to flow across it. The heating element 12 may comprise a conductive wire, cable, fibre, bundle of fibres or a conductive track (e.g. made of a PTC material) printed on a flexible support. The heating element 12 has a first 14 and a second 16 terminal connected to a first 18 and a second 20 terminal of a heating current supply 22, respectively. The heating current supply 22 (e.g. a direct current source and control electronics) and the heating element 12 form together the heating circuit of a heater, e.g. for a vehicle seat. The terminals of the heating current supply 22 typically have low AC impedance to AC-ground (e.g. due to coupling capacitors 23) in order to avoid that AC signals disturb the heating current supply 22. The heating current supply preferably comprises a user-actuatable master switch (not shown) allowing the user to activate or deactivate the heating circuit as a whole and a temperature controller (not shown; including e.g. a thermostat) that regulates the temperature to a comfortable level. When the heater is operating, the temperature controller opens and closes the heating circuit (low-frequency pulse-width modulation of the heating current) in such a way as to achieve a preset target temperature. Preferably, the target temperature may be selected by the user using a temperature control interface (e.g. a knob, a slider, a wheel or the like).

The combined heating and capacitive sensing system 10 further comprises a capacitive detector 24 connected to the heating element 12. The capacitive detector 24 is configured for using the heating element 12 as its antenna electrode. In particular, during operation, the capacitive detector 24 drives an alternating current into the heating element 12 and produces an output indicative of the capacitance between the heating element 12 and AC-ground. based upon the alternating current. In FIG. 1, block 26 symbolically represents the capacitive coupling (the complex impedance) of the heating element 12 to a grounded electrode (typically the vehicle frame). The complex impedance 26 between the heating element 12 and the grounded electrode depends on whether the space between the heating element 12 and the grounded electrode is occupied by a conductive body or not. The capacitive detector 24 illustrated in FIG. 1 operates in so-called loading mode. An oscillator 40 (e.g. an NCO) and a first current meter 42 are connected in series to the heating element 12.

The capacitive detector 24 comprises a common mode choke 28 with a coupling factor close to unity for essentially preventing the alternating current from flowing from the heating element 12 to the heating current supply 22. The common mode choke comprises three windings 30, 32, 34 arranged on the same magnetic core (and having the same number of windings). The first winding 30 is connected between the first terminal 14 of the heating element 12 and the first terminal 18 of the heating current supply 22. The second winding 32 is connected between the second terminal 16 of the heating element 12 and the second terminal 20 of the heating current supply 22. The third winding 34 is AC-coupled, via coupling capacitor 36 and current meter 38, to AC-ground.

During operation of the capacitive detector, the oscillator 40 applies an alternating voltage, causing an alternating current $I_{IN}$ to flow into the heating element 12. Part of the current flows across impedance 26 to AC-ground (current $I_X$). Since the common mode choke 28 cannot perfectly block alternating current, another part of the applied current flows to AC-ground via the windings 30, 32 and 34 of the common mode choke 28 (current $I_{choke}=I_1+I_2+I_3$, where $I_1$, $I_2$ and $I_3$ designates the alternating current across the first, second and third winding, respectively). From Kirchhoff's junction rule: $I_{IN}=I_X+I_{choke}$. Since $I_X$ contains the information about impedance 26, it is not sufficient to measure $I_{IN}$ if $I_{choke}$ cannot be neglected. As indicated above, it may be difficult, in practice, to design a common mode choke that presents both sufficient impedance to the alternating current of the capacitive sensor and low resistance to the direct heating current.

In accordance with the principles of the invention, in the illustrated example, the capacitive detector 24, in particular its second current meter 38, measures the part of the alternating current flowing across the third winding 34 of the common mode choke 28. Evaluation circuit 44 is connected to the first 42 and second current 38 meter so as to receive their measurement signals, indicative of $I_{IN}$ and $I_3$, respectively.

The AC impedance of the series connection of the coupling capacitor 36 and the second current meter 38 is adjusted in such a way that it is substantially equal to the AC impedance between the terminals 18 and 20 of the heating current supply 22 and AC-ground. That way, the alternating currents $I_1$, $I_2$ and $I_3$ across the three windings 30, 32 and 34 of the common mode choke 28 are substantially equal in amplitude and phase. The evaluation circuit may thus calculate the total alternating current across the common mode choke 28 as $I_{choke}=3 \cdot I_3$. The subtraction of $I_{choke}$ from $I_{IN}$ yields $I_X$. The multiplier 46 carries out the multiplication of the measurement value of $I_3$ by $-3$. The result of the multiplication is added to the measurement value of $I_N$ in adder 48, whereby the influence of the common mode choke is essentially compensated. The value of $I_X$ thus obtained is fed to decision circuit 50, which outputs the value of the complex impedance 26 and/or an occupancy status depending on $I_X$.

Figure 2:
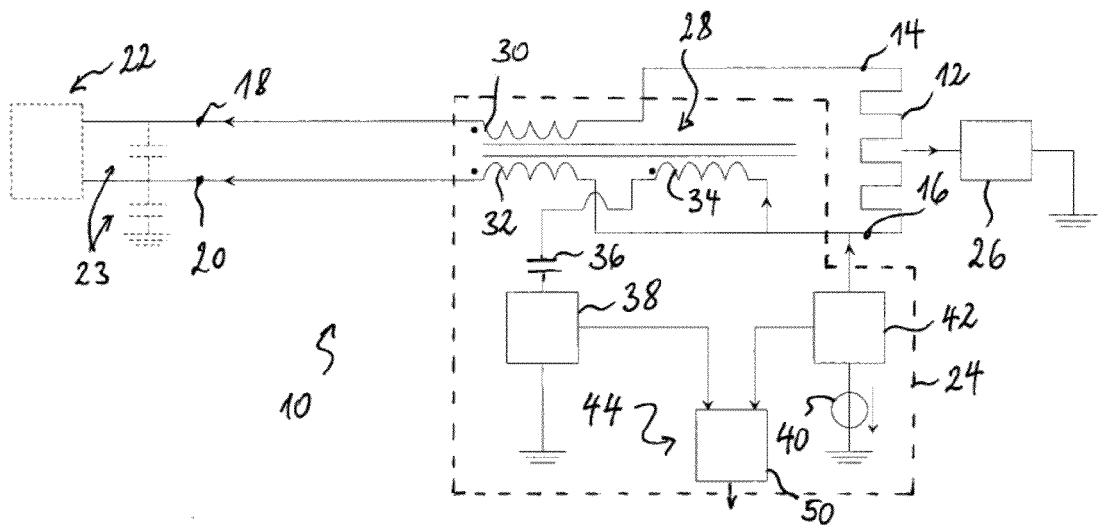
FIG. 2 is a schematic circuit diagram of a combined heating and capacitive sensing system according to a second example of the invention.

FIG. 2 shows a combined heating and capacitive sensing system 10 according to a second example of the invention. The only difference from the first example is that the decision circuit 50 of the evaluation circuit is directly connected to the current meters 42 and 38. The decision circuit 50 in this example takes its decision based on the two measurement signals as inputs. In all other respects, the example illustrated in FIG. 2 is identical to the example illustrated in and explained with respect to FIG. 1.

Figure 3:
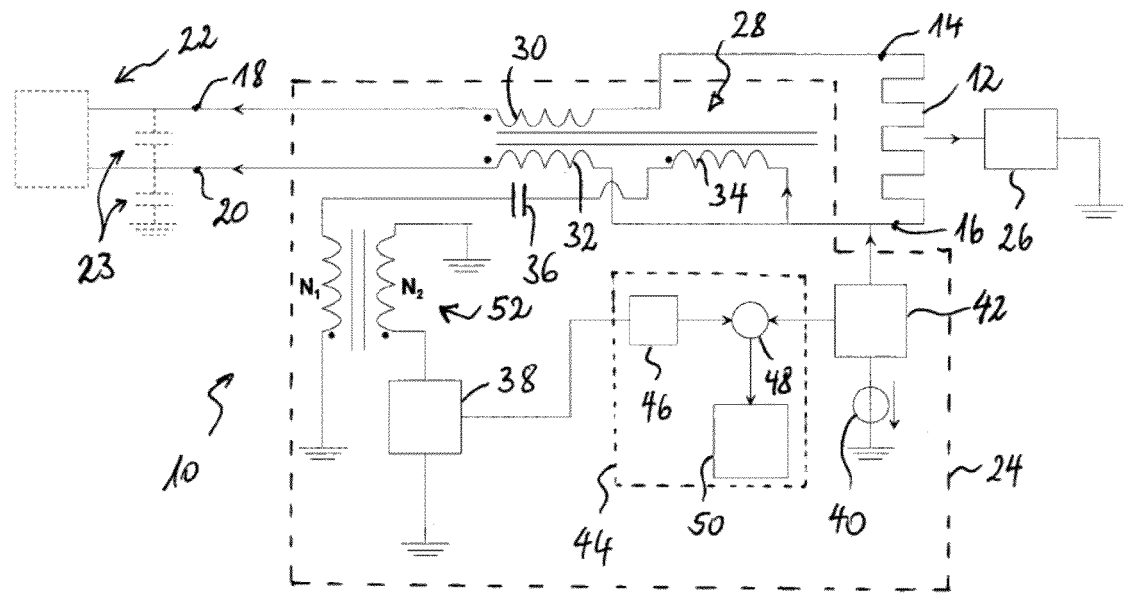
FIG. 3 is a schematic circuit diagram of a combined heating and capacitive sensing system according to a third example of the invention.

FIG. 3 shows a combined heating and capacitive sensing system 10 according to a third example of the invention. The third example differs from the first example (FIG. 1) in that the capacitive detector 24 comprises a step-up transformer 52 arranged between the third winding 34 and the second current meter 38. The primary winding of the step-up transformer 52 is connected between the third winding 34 of the common mode choke 28 and AC-ground and the secondary winding of the step-up transformer 52 is connected between AC-ground the input node of the second current meter 38. The number of turns $N_1$ of the primary winding is less than the number of turns $N_2$ of the secondary winding. The step-up transformer lowers the impedance "seen" by the alternating current across the third winding by a factor of about $N_1/N_2$. Accordingly, the configuration of FIG. 3 may be used if the second current meter 38 has too high input impedance compared to the impedances between the terminals 18, 20 and AC-ground. It should be noted that the current $I_3'$ input to the second current meter 38 amounts only to $N_1/N_2 \cdot I_3$. This has to be taken into account in the further calculations, e.g. in the multiplier 46. In this example, $I_X$ can finally be calculated by the formula: $I_X = I_{IN} - 3 \cdot N_2/N_1 \cdot I_3'$.

Figure 4:
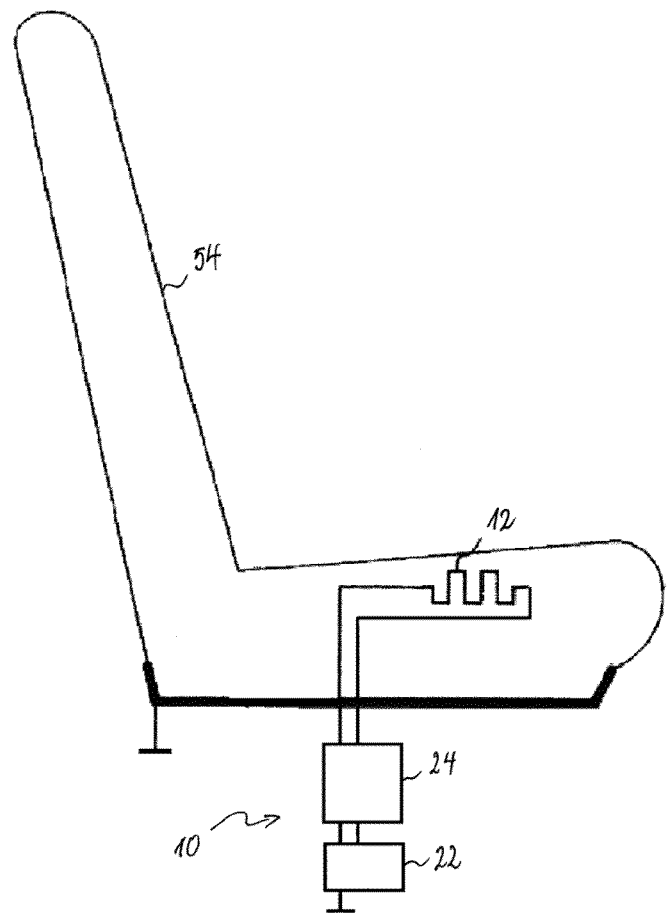
FIG. 4 is a schematic representation of a vehicle seat equipped with a combined heating and capacitive sensing system.

FIG. 4 is a schematic representation of a vehicle seat 54 equipped with a combined heating and capacitive sensing system 10 in accordance with the invention, e.g. as illustrated in any one of FIGS. 1 to 3.

Figure 5:
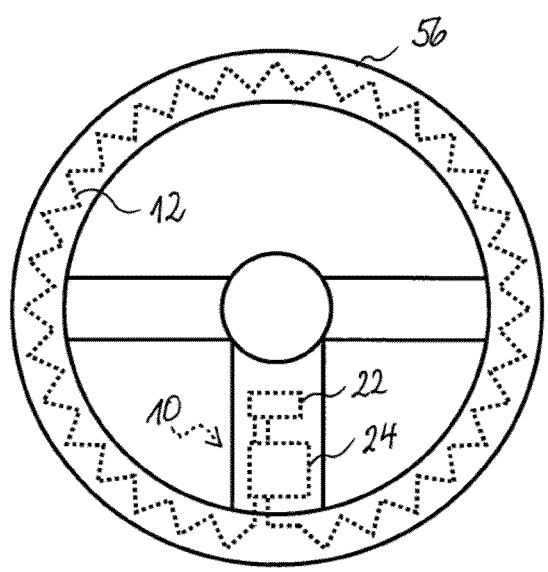
FIG. 5 is a schematic representation of a steering wheel equipped with a combined heating and capacitive sensing system.

FIG. 5 is a schematic representation of a steering wheel 56 equipped with a combined heating and capacitive sensing system 10 in accordance with the invention, e.g. as illustrated in any one of FIGS. 1 to 3.

While specific embodiments have been described in detail, those skilled in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

What is claimed is:

1. Capacitive sensing system for being connected to a heating element producing heat upon electrical current being caused to flow across it, said capacitive sensing system comprising
    a capacitive detector connectable to said heating element, configured for driving an alternating current into said heating element and for producing an output indicative of capacitance based upon said alternating current;
    a common mode choke having a first winding for connecting a first terminal of said heating element with a first terminal of a heating current supply and a second winding for connecting a second terminal of said heating element with a second terminal of said heating current supply, said common mode choke essentially preventing said alternating current from flowing from said heating element to said heating current supply;
    wherein said common mode choke comprises a third winding connected in parallel of at least one of said first and second windings, said capacitive detector being further configured for measuring a portion of said alternating current flowing across said third winding and for taking into account said measured portion of alternating current when producing said output.

2. Capacitive sensing system as claimed in claim 1, wherein said capacitive detector comprises a first current meter configured and arranged for measuring said alternating current driven into said heating element.

3. Capacitive sensing system as claimed in claim 2, wherein said capacitive detector comprises a second current meter configured and arranged for measuring said portion of said alternating current flowing across said third winding.

4. Capacitive sensing system as claimed in claim 3, wherein said capacitive detector comprises an evaluation circuit operatively connected to said current meters, said evaluation circuit being configured for producing said output using measurement signals of said current meters.

5. Capacitive sensing system as claimed in claim 1, wherein said third winding is AC-coupled to a reference node.

6. Capacitive sensing system as claimed in claim 5, wherein said capacitive detector comprises a first current meter configured and arranged for measuring said alternating current driven into said heating element, wherein said capacitive detector comprises a second current meter configured and arranged for measuring said portion of said alternating current flowing across said third winding, and wherein said capacitive sensing system comprises a step-up transformer having a primary winding connected between said third winding and said reference node and a secondary winding connected between said reference node and said second current meter.

7. Combined heating and capacitive sensing system, comprising
    a heating element for producing heat when electrical current is caused to flow across it,
    a heating current supply having a first terminal connected to a first terminal of said heating element and a second terminal connected to a second terminal of said heating element so as to form a heating circuit,
    a capacitive detector connected to said heating element, configured for driving an alternating current into said heating element and for producing an output indicative of capacitance based upon said alternating current;
    a common mode choke having a first winding connected between said first terminal of said heating element and said first terminal of said heating current supply and a second winding connected between said second terminal of said heating element and said second terminal of said heating current supply, said common mode choke essentially preventing said alternating current from flowing from said heating element to said heating current supply;

wherein said common mode choke comprises a third winding connected in parallel of at least one of said first and second windings, said capacitive detector being further configured for measuring a portion of said alternating current flowing across said third winding and for taking into account said measured portion of alternating current when producing said output.

8. Combined heating and capacitive sensing system as claimed in claim 7, wherein said capacitive detector comprises a first current meter configured and arranged for measuring said alternating current driven into said heating element.

9. Combined heating and capacitive sensing system as claimed in claim 8, wherein said capacitive detector comprises a second current meter configured and arranged for measuring said portion of said alternating current flowing across said third winding.

10. Combined heating and capacitive sensing system as claimed in claim 9, wherein said capacitive detector comprises an evaluation circuit operatively connected to said current meters, said evaluation circuit being configured for producing said output using measurement signals of said current meters.

11. Combined heating and capacitive sensing system as claimed in claim 7, wherein said third winding is AC-coupled to a reference node.

12. Combined heating and capacitive sensing system as claimed in claim 11, wherein said capacitive detector comprises a first current meter configured and arranged for measuring said alternating current driven into said heating element, wherein said capacitive detector comprises a second current meter configured and arranged for measuring said portion of said alternating current flowing across said third winding, and comprising a step-up transformer having a primary winding connected between said third winding and said reference node and a secondary winding connected between said reference node and said second current meter.

13. Combined heating and capacitive sensing system as claimed in claim 7, implemented as a combined seat heating and capacitive occupancy sensing system, said output produced by said capacitive detector being indicative of a seat occupancy state.

14. Vehicle seat equipped with a combined heating and capacitive sensing system as claimed in claim 13.

15. Steering wheel comprising a combined heating and capacitive sensing system as claimed in claim 7.

* * * * *